Patented Oct. 14, 1947

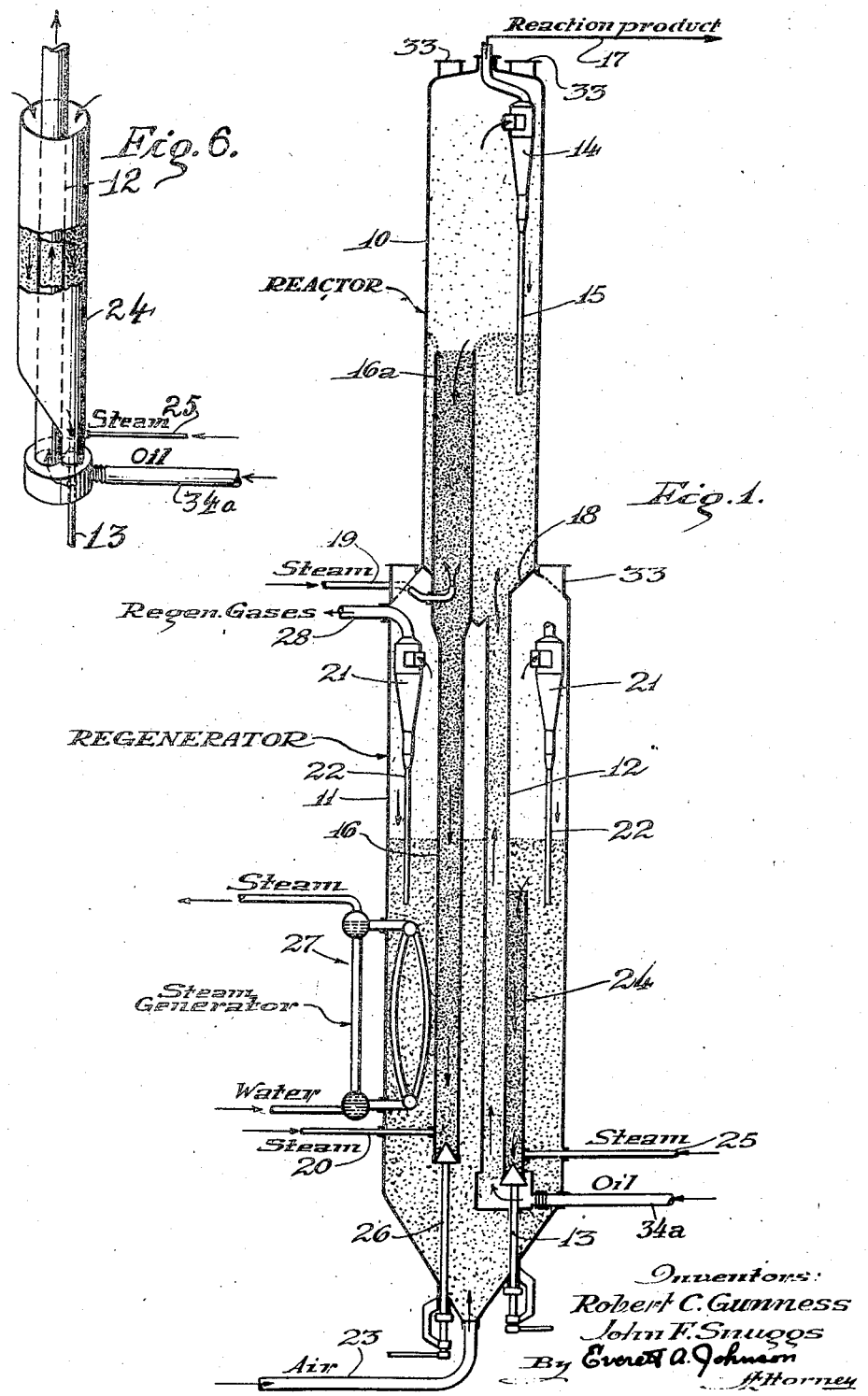

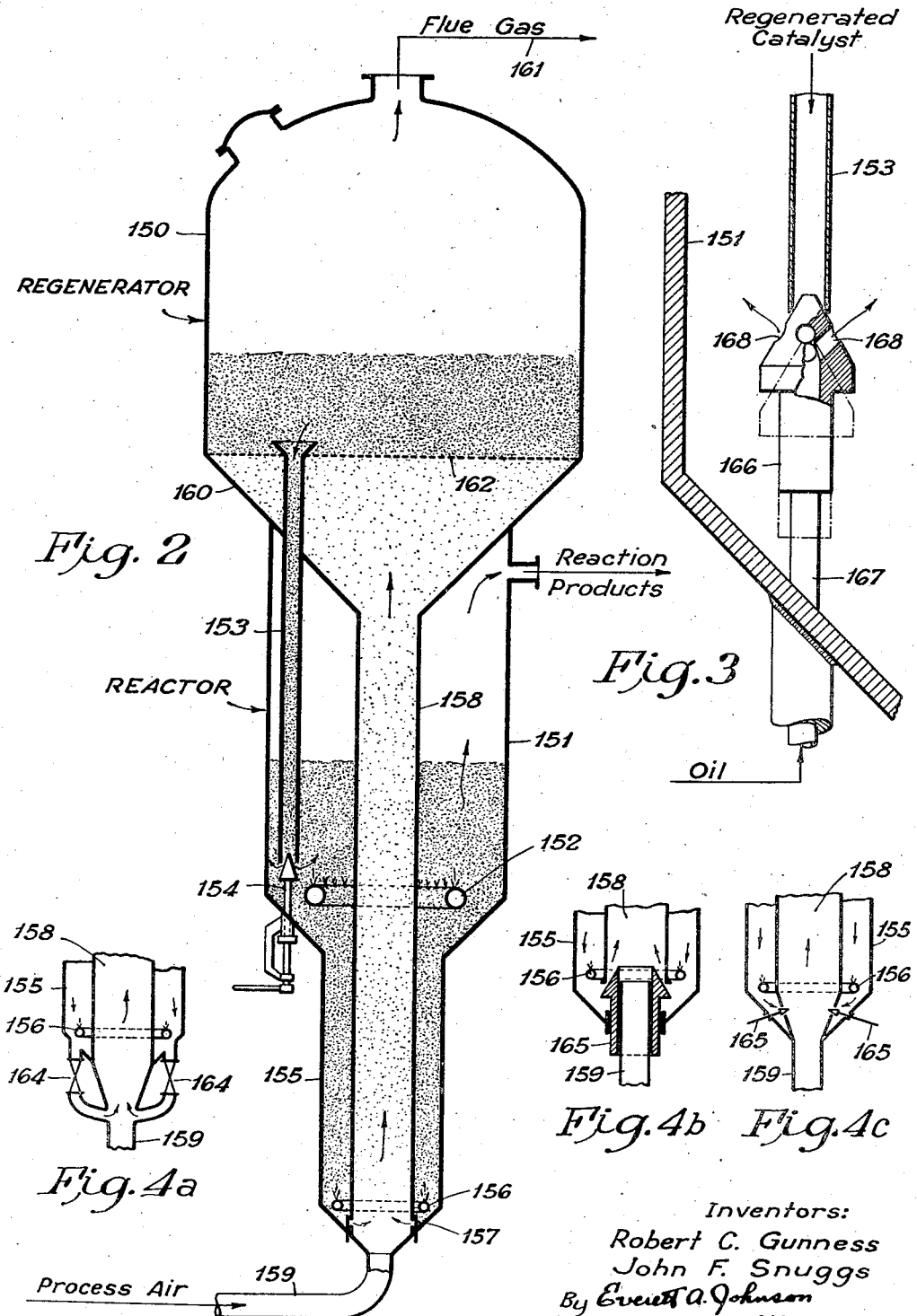

2,428,873

UNITED STATES PATENT OFFICE 2,428,873

PROCESS AND APPARATUS FOR CATALYTIC CONTACTING

Robert C. Gunness, Flossmoor, and John F. Snuggs, Chicago, Ill., assignors to Standard Oil Company, Chicago, Ill., a corporation of Indiana Application May 26, 1945, Serial No. 595,922

26 Claims. (Cl. 196—52)

Our invention pertains to a catalytic hydrocarbon conversion system and it relates more particularly to improvements in process and unitary apparatus for handling fluid catalyst in a so-called fluid-type hydrocarbon catalytic conversion system.

This application is a continuation-in-part of copending application Serial Number 412,988, filed September 30, 1941.

In the fluid-type catalytic hydrocarbon conversion system a powdered or granular catalytic material effects conversion while the catalyst is suspended in the gases or vapors undergoing reaction. Subsequently the catalyst and reaction products can be separated and the catalyst recycled to a reaction zone or passed to a regenerator. The spent catalyst can be regenerated by suspending it in a gas mixture in which case a regenerated catalyst and regeneration gases must be separated before the catalyst is returned to the reaction zone.

The powdered or fluid-type catalytic hydrocarbon conversion system can employ a wide variety of catalysts, charging stocks, operating conditions, etc. for effecting adsorption, alkylation, aromatization, cracking, dehydrogenation, desulfurization, gas reversion, hydrocarbon synthesis, hydrogenation, isoforming, isomerization, polymerization, reforming, etc. and it is particularly applicable to the catalytic cracking of reduced crude or gas oil for the production of high antiknock motor fuels, and aviation gasolines.

An object of our invention is to provide improved methods and means for transferring finely divided catalyst from a reactor or regenerator. A further object is to minimize expansion difficulties, particularly in connection with standpipes which are employed for obtaining the necessary pressure differentials for transferring catalyst from one zone to another. Another object is to provide a unitary conversion-regeneration apparatus which will be less expensive to fabricate and more efficient to operate than any prior system of this type.

A further object of our invention is to provide a more simple and efficient method and means for separating catalyst from gases or vapors in a regenerator or reactor and for minimizing the energy required to transfer catalyst from one zone to another. Other objects of the invention will be apparent as the detailed description proceeds.

These and other objects of our invention are attained by providing method and means for a cyclic system employing upper and lower contacting zones. Finely divided solids are suspended in a first gasiform fluid and passed upwardly in a first contacting zone at a velocity sufficient to maintain a dense turbulent suspended solids phase within the contacting zone, said dense phase being superimposed by a light phase of low solids content. The dense phase solids are passed downwardly from said contacting zone as an aerated column of solids which is separated laterally from the dense phase solids in the first contacting zone but which communicates with the dense phase in the said contacting zone. A plurality of such columns can be provided if desired although the description is with reference to a single column. Aerated solids are discharged from the base of the column into a second or lower contacting zone. The discharged solids are suspended within the lower contacting zone in a second gasiform fluid stream, the gasiform fluid being passed upwardly through said contacting zone at a velocity sufficient to maintain a dense turbulent suspended solids phase above the point of introduction, superimposed by a light phase of low solids content. The dense phase solids within the lower contacting zone are withdrawn directly from the dense phase and resuspended in the first gasiform fluid stream. The lower contacting chamber may be operated at a slightly higher or lower pressure than the upper chamber. However, the bulk density of the suspended dense phase catalyst of the two contacting zones can be maintained at substantially equivalent values.

It is contemplated that either the upper or the lower contacting chamber can be used for reaction and regeneration. When the system is employed for reaction and regeneration, an intermediate contacting zone may be employed preceding the zone in which regeneration occurs. The solids are transferred into the intermediate zone in the dense phase where the solids are contacted countercurrently with an upwardly flowing stream of a third gasiform fluid. Such contacting effects stripping of the solids and the stripped solids are introduced into the next contacting zone.

In practicing our invention we can directly superimpose one reactor or regenerator over the other. An important feature of the invention is the use of floating standpipes, i. e., standpipes which extend upwardly or downwardly, or both upwardly and downwardly, from a single point of support. The standpipes may be from 25 to 100 feet in height. If a standpipe fixed in the base of the superimposed chamber extends upwardly therein for a distance of 25 or 30 feet, no allowance will have to be made for expansion of that portion of the standpipe since the upper end thereof is free, i. e., is floating, and is not subject to stresses or strains occasioned by the expansion or contraction thereof. Likewise a standpipe which extends downwardly within a regeneration or reaction zone may similarly be described as floating. In our invention wherein the top of the regenerator constitutes the bottom of the reactor, or the top of the reactor comprises the bottom of the regenerator, a standpipe may extend upwardly in the upper zone and downwardly in the lower zone from the intermediate support and thus entirely avoid any expansion problems.

A feature of our invention is the withdrawal of catalyst solids from a reactor directly from a dense turbulent suspended catalyst phase and the introduction of said catalyst into the dense suspended phase of the regenerator. Likewise the regenerated catalyst can be withdrawn from the dense turbulent suspended catalyst phase within the regenerator and introduced into the dense phase of the reactor. If desired, this withdrawal can be made from an upper part of the dense solids phase.

The solids per se forms no part of the present invention and it is, therefore, unnecessary to describe it in detail. It is contemplated, however, that the catalyst can be preformed as microspheres or ground after drying.

Catalysts adapted for effecting cracking in our system can be of the silica-alumina or silica-magnesia type. The catalyst can be prepared by the acid treating of natural clays such as bentonite or by synthetically preparing a powdered silica-alumina or silica-magnesia mixture. Such a mixture can be prepared by ball-milling silica hydrogel with alumina or magnesia, drying the resulting dough at a temperature of about 240° and then activating by heating to a temperature of between about 900° F. and about 1000° F.

When using powdered catalyst having a particle size of between about 1 and about 135 microns, we prefer to employ vapor velocities in the reactor of between about 0.4 and about 4 feet per second, for example, about 1.5 or 2 feet per second. The catalyst-to-oil weight ratio can be between about 0.5:1 and about 30:1 and is preferably about 8 or 10 to 1 when treating reduced crude. In general the type of charging stock and the type of reaction desired will influence the catalyst to oil ratio. The catalyst residence time may range from a few seconds to an hour or more, for example, it may be about 4 to 10 minutes. The vapor residence time is usually about 10 to 30 seconds. The temperature prevailing throughout the reactor may be maintained at between about 750° and about 1050° F.; for example, about 900° F. to about 975° F. A temperature as low as about 750° F. is satisfactory for aviation fuels.

The charging stock employed will be selected in view of the desired reaction and product. When the system is to be used for catalytic cracking, the charge can comprise gas oil, reduced crude, lube oil extracts, coker gas oil, thermally or catalytically cracked recycle stocks, or the like.

The catalyst used can be in powder form with a particle size of between about 1 and about 135 microns; i. e., with about 50% of the catalyst passing a 400-mesh screen. The invention is applicable, however, to other catalyst sizes provided only that the solids are of such size and density that they can be aerated and handled as a fluid in the manner herein described. Higher gas or vapor velocities may be required for coarser catalyst particles but these particles can be of such size as to be retained on a 400, 300, 200, 100, or even 50-mesh screen.

The density of the catalyst particles per se may be as high as 160 pounds per cubic foot, but the bulk density of the catalyst which has settled for five or ten minutes will usually be from about 35 to about 60 pounds per cubic foot. With slight aeration, i. e., with vapor velocities of between about 0.05 and about 0.5 feet per second, the bulk density of 1 to 135 micron catalyst will be between about 20 and about 30 pounds per cubic foot. With vapor velocities of between about 1 and about 3 feet per second, the catalyst is in the dense turbulent suspended catalyst phase and the bulk density of such catalyst may be between about 10 and about 20 pounds, for example, at about 1.5 feet per second it is about 15 to 18 pounds per cubic foot. With larger and heavier catalyst and the same vapor velocity the bulk density will be even higher. With higher vapor velocities, i. e., the vapor velocities existing in transfer lines, the catalyst is in a dilute dispersed phase, the density of which may be about 1 or 2 pounds per cubic foot, or more. Similarly, the light dispersed catalyst phase such as in the top of the reactors or regenerators can have a density of between about 0.0005 or 0.0015 pound and about 3 pounds per cubic foot. The light dispersed catalyst phase is at least 5, and preferably is at least 12 pounds per cubic foot lighter than the dense turbulent suspended catalyst phase. This latter phase usually is at least 1, preferably at least 5, pounds per cubic foot lighter than the aerated catalyst being transferred to the dense phase.

The bulk density of the aerated catalyst phase or the dense turbulent suspended catalyst phase is greater in the absence of appreciable catalyst fines than in the presence of substantial amounts of such fines. When the recovered catalyst consists almost entirely of fines, as exemplified by catalyst particles separated from the dilute phase by cyclones, the bulk density of settled or lightly aerated catalyst may be only 10 or 15 pounds per cubic foot.

In practicing our invention we withdraw catalyst directly from the dense turbulent suspended catalyst phase through one or more overflow pipes or standpipes which are of the suspended or floating standpipe type hereinabove described. The catalyst in the standpipes is in the dense aerated phase and is therefore of greater bulk density than the catalyst in the dense turbulent suspended catalyst phase. We utilize this difference in static pressure to provide the catalyst head in the standpipes required for transferring catalyst from the reactor to the regenerator, or from regenerator to reactor, and for preventing the flow of gases from one zone to another. Catalyst fines are centrifugally separated from gases or vapors leaving either the reactor or regenerator and are introduced into the main body of catalyst in the respective reactor or regenerator. Other features of the invention will be apparent from the following detailed description.

In the accompanying drawings which constitute a part of this disclosure and in which similar elements are designated by corresponding reference characters:

Figure 1 is a schematic diagram of a unitary catalytic unit of the superimposed type;

Figure 2 is a schematic diagram of another modification of a unitary contacting unit;

Figure 5:
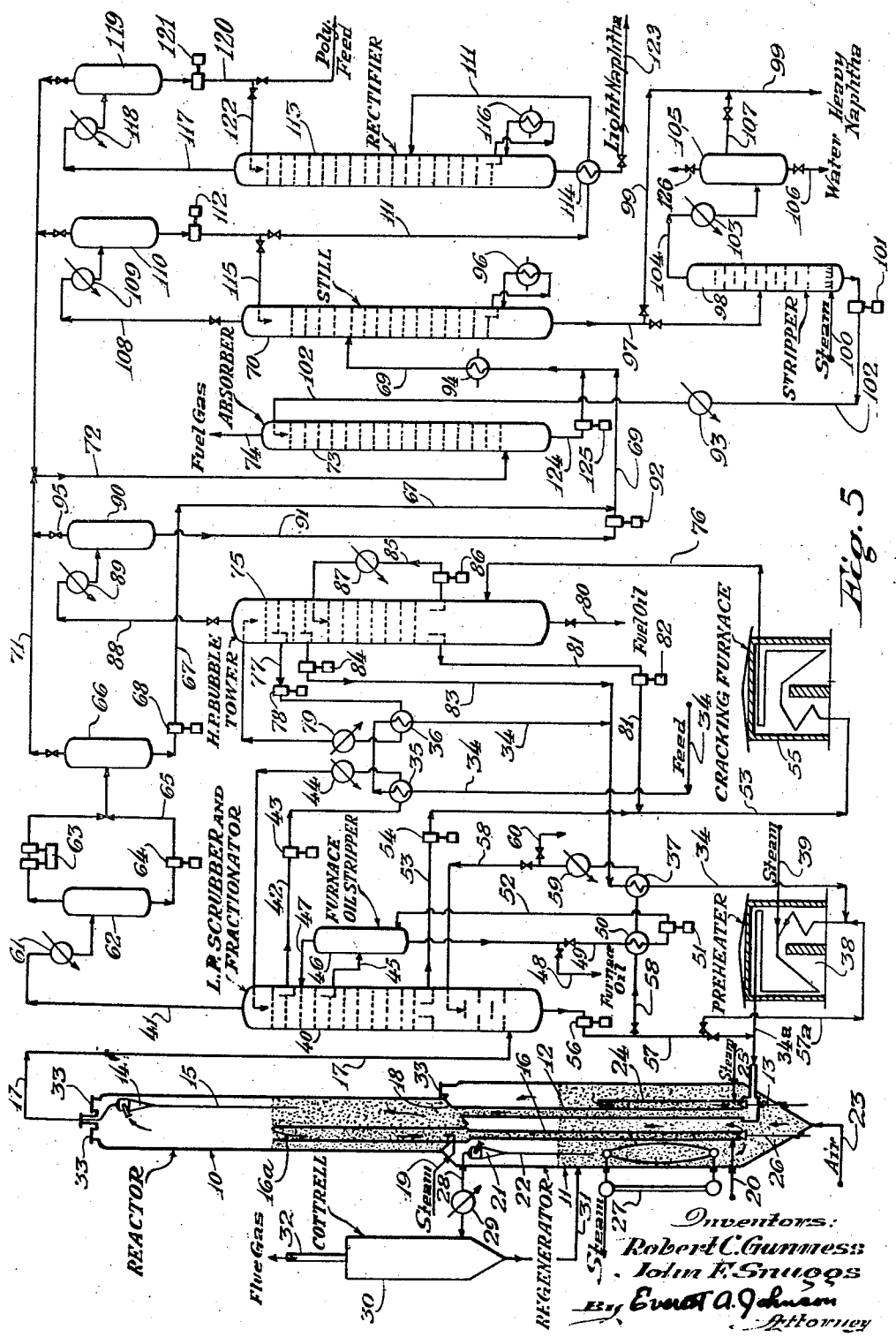

Figures 3, 4a, 4b, and 4c illustrate examples of valve means adapted for use in our unitary contacting units; and Figure 5 is a schematic flow diagram of a catalytic cracking system employing a unitary superimposed reactor-regenerator.

Figure 6 is a schematic detail partly in section illustrating a concentric conduit arrangement for the system illustrated in Figure 1.

To illustrate our invention we will describe the system for the catalytic cracking of reduced crude to motor gasoline by means of a silica-alumina catalyst as hereinabove described, i. e., a catalyst having a particle size of about 10 to 135 microns.

Figure 1 illustrates diagrammatically in more or less detail a unitary reactor 10 above regenerator 11. Reactor 10 should be designed to provide a vertical vapor velocity therein of between about 1 and about 3 feet per second at a temperature within the range of between about 800° F. and about 1050° F., preferably between about 900 and about 1000° F., and at a pressure of between about atmospheric and about 50 pounds per square inch, for example about 15 pounds per square inch at its base. The charging stock may be heated in a pipe still to this reaction temperature or it may be simply preheated and only partially vaporized in the pipe still, at least a substantial part of the heat of cracking and, if desired, the heat required for completing the vaporization being supplied by the sensible heat contained in the hot regenerated catalyst which is introduced into the reactor 10 by means of vertical transfer line 12 in amounts regulated by valve 13.

The ratio of introduced catalyst to introduced oil in reactor 10 may range from about 0.5:1 to about 20:1 depending upon the activity of the catalyst, the amount of heat which is to be supplied to the reactor, and the desired catalyst residence time within the reactor. Where reduced crude is employed as a charging stock the catalyst-to-oil ratio may be about 8:1 or 10:1, or higher, in order to supply at least a considerable part of the heat of vaporization as well as the heat of cracking by the sensible heat contained in the added catalyst.

As stated above, the upflowing vapors in the reactor 10 are of such velocity as to maintain a dense turbulent suspended catalyst phase throughout the conversion zone. The reactor 10 may be about 30 or 40 feet high and it may be provided with an enlarged upper section to facilitate the settling of catalyst out of the dilute phase into the dense turbulent suspended catalyst zone. Catalyst fines are knocked out of the cracked vapors in cyclone separators 14 and returned through dip legs or standpipes 15 to the dense turbulent phase or directly to the standpipe 16. Ordinarily the cyclone separators 14 will be employed in groups of several sets, each set comprising two or three stages. However, when desired one or more sets may be operated in parallel. The vapors from line 17 pass to the recovery apparatus described below.

The reactor 10 may be provided with a curved or inclined bottom wall 18 which also serves as the top wall for the regenerator 11 and will be hereinafter described. A "floating" standpipe 16 extends from a point within the reactor 10 to a point near the base of the regenerator 11. This standpipe extends upwardly into reactor 10 for a distance of between about 5 and about 25 feet and it may expand or contract without setting up any strains in the system which might require the use of expansion joints. The upper part 16a of the "floating" standpipe 16 can be enlarged to provide for stripping by steam introduced through line 19. Spent catalyst from the dense turbulent suspended catalyst phase overflows into the enlarged upper section 16a of this standpipe 16 and is stripped with steam therein before being withdrawn through the depending portion of standpipe 16 into the regenerator 11. Catalyst in standpipe 16 can be aerated, for example by steam introduced through line 20, or by a plurality of introduction ports over the length of the standpipe.

The curved or inclined bottom wall 18 of the reactor is the top wall of the regenerator 11 as hereinabove described. The regenerator 11 may be of slightly larger diameter and of greater height than the reactor 10 and it may be provided with an enlarged top section to facilitate the settling of catalyst particles out of the upper dilute catalyst phase. Cyclone separators 21 knock back the catalyst fines removed from the regeneration gas, the separated catalyst passing by dip legs or standpipes 22 into the dense phase. Air or other oxygen-containing regeneration gases may be admitted to the regenerator 11 by means of conduit 23 near the base thereof. The regenerated catalyst flows from a point near the top of the dense turbulent suspended catalyst zone downwardly into standpipe 24 adjacent to and contiguous with vertical transfer line 12 as shown in Figure 1 or concentric with internal vertical transfer line 12 as illustrated in Figure 6. In another arrangement of 12, 13 and 34a, the conduit 34a extends vertically through the bottom of 11 to a point below 24. The control for valve 13 passes within this vertical conduit 34a. A similar arrangement of 26 and 23 reduces the number of glands and connections necessary. A stripping and aerating steam line 25 can be provided to permit the stripping of oxygen-containing gas out of the regenerated catalyst before the catalyst is carried upwardly through vertical transfer line 12 to the reactor 10. The stripping steam line 25 may enter the regenerator 11 at a point near the base thereof or may be provided with suitable bends (not shown) for avoiding any differential expansion difficulties.

The regenerated catalyst and charging stock flow upwardly through vertical transfer line 12 and discharge into the dense turbulent phase of reactor 10 near the base thereof. The regenerator 11 may be operated at a slightly higher pressure than the conversion zone or it may be operated at substantially the same pressure since the bulk density of aerated catalyst in standpipe 16 is greater than the bulk density of the dense turbulent suspended catalyst phase through which this standpipe extends thereby resulting in a difference in static pressure. Thus the pressure at the base of standpipe 16 may be from 1 to 5 pounds per square inch greater than the pressure in the regenerator at this point. Valve 26 is designed to automatically close and seal the lower end of the standpipe if this pressure differential becomes less than about 1 pound per square inch because it is ordinarily desirable that the vapors or gases from one zone should be prevented from reaching the other.

If more heat is liberated in the regenerator 11 than need be stored in the catalyst to maintain the desired heat balance, means may be provided for removing heat from the regenerator whereby the desired temperature limits of between about 1000° F. and 1050° F. (sometimes higher, e. g., 1300° F. with certain catalysts) are not exceeded. Excess heat may be removed by the provision of heat exchange tubes in the regenerator, such tubes preferably being mounted around the periphery thereof so that they will not interfere with the dense turbulent suspended catalyst phase phenomenon. Steam generator 27 represents one such unit. An alternative method of temperature control is to recycle the catalyst through a cooler and return the cooled catalyst to the regenerator. Thus catalyst may be removed from the dense turbulent suspended catalyst phase in the regenerator, passed through a cooler (not shown), and returned to the regenerator.

The amount of air or oxygen-containing gas introduced through line 23 must be sufficient at least to effect the desired regeneration and to provide for a vertical gas velocity in the regenerator of between about one and three feet per second in order that the desired dense turbulent suspended catalyst phase may be maintained in the regenerator up to at least the top level of standpipe 24. Since the introduction of the spent catalyst is independent of the introduction of regeneration gas, cold air or oxygen-containing gas may be used to regulate the temperature of regeneration.

As shown in Figure 5, the flue gas from line 28 may be passed through suitable heat exchangers 29 or turbines (not shown) for recovering heat or energy therefrom and catalyst dust may be separated by means of an electrostatic precipitator 30 and reintroduced into the system by any desired means, for example line 31. Flue gas is removed by line 32 and a portion may be recycled to the regenerator 11.

Provision for the withdrawal of cyclones from the top of the reactor or regenerator is made by placing manholes 33 of sufficient size on the shoulder of the regenerator and on the top of the reactor to permit the withdrawal of said cyclones.

Figure 2 illustrates diagrammatically, in more or less detail, another modification of our system which includes a regenerator 150 above a reactor 151 which can be used for the catalytic cracking of gas oil. In the apparatus illustrated in Figure 2 the reactor can be about 25 feet in diameter and about 30 feet high. A dense turbulent suspended bed of catalyst can be maintained at a depth of about 15 feet in the reactor, the catalyst in the dense phase having an apparent density of between 15 and 20 pounds per cubic foot, e. g., 17 pounds per cubic foot. The catalyst disengaging space or dilute catalyst phase extends about 15 feet above the level of the dense phase catalyst. Within this space cyclones can be provided to remove catalyst as described in connection with Figure 1. Such a reactor is designed to employ a vertical gasiform fluid velocity therein of between about 1 and about 3 feet per second; for example, about 1.5 feet per second. A temperature within the range of between about 800° F. and about 1050° F., preferably at about 900° F. and at a pressure of between about atmospheric and about 50 p. s. i.; for example, about 8 p. s. i. can be used. The charge, which may comprise for example gas oil or a mixture of oil and steam or the like, can be supplied to the reactor by distributor 152 or by valve 154. Valve 154, however, may be constructed in a manner similar to valves 26 and 13 of Figure 1 when the charge is separately introduced into reactor 151 as by distributor 152.

Referring to Figure 3, the details of one embodiment of the valve 154 are illustrated. A mechanically-actuated, hollow valve closure 166 communicates with a conduit 167 which passes through the wall of the reactor 151, the closure 166 cooperating with standpipe 153 to control the flow of solids therefrom. Ducts 168 permit the introduction of the charge fluid into the reaction zone.

Reverting to Figure 2, all or part of the heat required for effecting vaporization of the charging stock may be supplied by the sensible heat contained in the hot regenerated catalyst which is introduced into the reactor 151 by means of the floating standpipe 153 in amounts regulated by valve 154. A plurality of standpipes 153 and valves 154 can be employed. The ratio of introduced solids to introduced fluids in the reactor 151 may range from between about 0.5 to 1 and about 30 to 1, depending upon the activity of the solids, the amount of heat to be supplied by the solids, and the desired solids residence time within the reactor.

Extending below the reactor 151 is a stripper 155 which can be about 25 feet high and, as illustrated, comprises an annulus of about three feet about a transfer conduit 158. Stripping fluid such as steam can be supplied by distributor 156. Valve means illustrated at 157 control the transfer of solids from the stripper 155 into the vertically extending transfer conduit 158. Gasiform fluid can be admitted by line 159 and passed upwardly through the conduit 158. The pressure drop across the valve 157 can be between about 1 and about 10 pounds, for example, in the modification illustrated, about 7 pounds per square inch.

The valve means 157 is illustrated as a vertically disposed slide valve. Other types of valves can be used, and examples are shown by Figures 4a, 4b, and 4c. Figure 4a employs a plurality of valve means 164 which introduce separate quantities of catalyst into conduits 159 or 158. Such valve means 164 can comprise slide, star, or plug valves. In Figure 4b an adjustable hollow member 165 is provided and the gasiform fluid is supplied therethrough by 159. The embodiment of Figure 4c substitutes plug valves 165 for the slide valve of Figure 2. These plug valves can be similar to valves 13 and 26 of Figure 1. It is also contemplated that the slide valve 157 of Figure 2 can be disposed horizontally or obliquely.

The regenerator 150 may be provided with a curved or inclined bottom wall 160 which also serves as the top wall for the reactor 151. A floating standpipe 153 extends from a point within the regenerator 150 to a point within the dense phase in the reactor 151. This standpipe extends upwardly into the regenerator 150 for a distance of between about 5 and 15 feet and passes through grid 162. This grid may comprise a plate having perforations which represent between about 3 to 10 per cent of the total plate area and normally can be designed for a pressure drop of about one-half pound. The pressure drop between the valve 157 and the grid 162 can be about 2 pounds. The regenerator 150 may be between about 35 and 40 feet in diameter and a bed of catalyst having a density of between about 15 and 20 pounds per cubic foot can be maintained at a depth of between about 5 and 20 feet with an upward gasiform fluid velocity of about 1.5 feet per second. A catalyst disengaging space of about 15 feet can be maintained above the level of the suspended catalyst and the pressure within the regenerator 150 is about 3 pounds per square inch gauge. Cyclone separators may be used for catalyst separation as herein described. The cyclone separators can be used to knock back the catalyst fines from the regeneration gas and the separated catalyst passed by dip legs or standpipes into the dense phase. Means for the removal of cyclones from the top of the reactor or regenerator can be made by providing suitable manholes.

Air or other oxygen-containing regeneration fluids may be admitted to the regenerator 150 by means of conduits 159 and 158 communicating with the base thereof. The pressure drop along 158 and across grid 162 can be of the order of about 2.5 pounds. The amount of air or oxygen-containing gas introduced through line 158 must be sufficient at least to effect the desired regeneration and to provide for a vertical gas velocity in the regenerator 150 of between about 1 and 3 feet per second. Substantially higher linear velocities can be employed in the transfer conduit 158 and may be of the order of between about 10 and about 100 feet per second. The regenerated catalyst flows from a point in the dense turbulent suspended catalyst phase within the regenerator 150 downwardly through one of standpipes 153, valve 154 being used to control the flow into reactor 151. The pressure drops across valve 154 can be of the order of between about 0.5 and 3 pounds per square inch, for example, about 2 pounds in the modification shown.

If more heat is liberated in the regenerator 150 than need be stored in the solids for maintaining the desired heat balance, means can be provided for removing heat from the regenerator. Such heat may be removed by providing heat exchange tubes in the regenerator, preferably around the periphery thereof so that there may be a minimum interference with suspended catalyst. Other means for temperature control described in connection with Figure 1 may, of course, be employed.

Since the introduction of the spent catalyst is independent of the introduction of the regeneration fluid, the gas can be precooled or heated to aid in controlling the regeneration temperature. The flue gases from line 161 may be passed through suitable heat exchangers or turbines for recovering heat or energy therefrom and residual catalysts may be separated by an electrostatic precipitator, by liquid scrubbing, or the like and reintroduced into the system. The flue gas or a portion thereof may be recycled to the regenerator 150 together with, or independent of, the regeneration gas introduced by line 158.

Although the operation of the apparatus in Figure 2 has been described with reference to examples of charging stock, catalyst densities, presssure drops, temperatures, etc., it should be understood that this is for the purpose of illustration.

Referring to Figure 5, reduced crude, gas oil or the like is charged to the system by line 34 and passed through heat exchangers 35, 36 and 37 to preheater furnace 38. Thus by heat exchange the fresh feed produces reflux for the fractionation of the catalytically and the thermally cracked products. The feed enters the preheater 38 at a temperature that may be as high as about 450° F. and is further heated in the furnace 38 and injected into reactor 10 via line 34a. If desired, a flash tower can be interposed following the preheater 38. The bottoms from the flash tower can be fed to the reactor 10 by liquid injection or can be thermally cracked or coked.

Feed may enter the reactor as a liquid, as a vapor, or as a mixture of liquid and vapor. 2% to 20% steam may be added to the charge via line 39. Additional heat may be added by the heat of the regenerated catalyst to maintain a vapor phase cracking temperature within the range of between about 800° F. and about 1100° F.

The product from the catalytic cracking is removed from reactor 10 via line 17 and passed to low pressure scrubber and fractionator 40. The scrubber and fractionator 40 may be operated at about 5 pounds per square inch with a temperature of between about 180° F. and 250° F. near its top and a bottoms temperature of between about 500° F. and 600° F. The gases and light naphtha are taken overhead by line 41 to an absorption plant for recovery of condensables as hereinafter described.

A reflux side stream is withdrawn by line 42 and pump 43, passed through heat exchanger 35, cooler 44 and returned to fractionator 40. A furnace oil cut is taken off by line 45 to furnace oil stripper 46. The overhead from stripper 46 is returned to fractionator 40 via line 47. A stabilized furnace oil may be taken off by valved line 48. At least a portion of the furnace oil from stripper 46 may be heat-exchanged with at least a portion of the heavy recycle gas oil from fractionator 40. Valved line 49, heat exchanger 50, pump 51 and line 52 are provided for this purpose.

A heavy gas oil is withdrawn from fractionator 40 by line 53 and pump 54 as charging stock for thermal cracking furnace 55. All or a portion of the heavy recycle gas oil obtained as bottoms from fractionator 40 may be recycled to the catalytic cracking. Pump 56 and valved line 57 are provided for this purpose. If desired these bottoms can be put through preheater 38 by valved line 57a.

A portion of the bottoms can be diverted from line 57 via line 58 through heat exchangers 50 and 37 and returned to fractionator 40 via line 58. Cooler 59 in line 58 removes residual heat and furnishes the scrubbing liquid for removing catalyst fines from the vapors of line 17. The bottoms from 40 may leave at a temperature of between about 500° F. and 600° F. and reenter tower 40 at between about 325° F. and about 425° F., for example 380° F. A valved line 60 is provided to permit the discard of the heavy bottoms from fractionator 40.

The overhead from low-pressure scrubber and fractionator 40 is removed via line 41 and the temperature of this stream may be between about 180° F. and 250° F. These gaseous products are passed through cooler 61 and thence into separator 62. The gases overhead from low-pressure separator 62 are compressed by compressors 63 and the liquid bottoms are pumped by pump 64 and line 65 into high-pressure separator 66. It is also contemplated, but not shown, that part of the liquid from separator 62 may be sent as reflux to the low pressure scrubber and fractionator 40. The liquid bottoms from high-pressure separator 66 is pumped via line 67 and pump 68 to line 69 flowing into still 70. The gases pass via lines 71 and 72 to absorber 73, the unabsorbed gases from absorber 73 being removed as fuel gas via line 74. Although still 70 is illustrated as processing the fractions from both lines 67 and 91 referred to below, it is contemplated that separate recovery systems can be used for the catalytic product in line 67 and the thermal product in line 91.

Reverting to the thermal cracking step, the light gas oil withdrawn by line 53 and pump 54 is charged to the thermal cracking furnace 55, the cracked product enters high-pressure bubble tower 75 via transfer line 76. Reflux for the tower 75 is provided by taking off a side stream by line 77 and pump 78, passing through heat exchanger 36 and cooler 79 and returning the cold stream to the top of the high-pressure bubble tower. A heavy fuel oil is withdrawn via valved line 80 as bottoms from high-pressure bubble tower 75. A recycle gas oil is withdrawn via line 81 and pump 82 and recycled via line 53 to the thermal cracking furnace 55. An intermediate gas oil is withdrawn via line 83 and pump 84 for catalytic cracking. This side stream is blended with the fresh feed and enters preheater furnace 38 via line 34. A portion of the recycle gas oil cut may be removed via line 85, pump 86 and cooler 87 and returned to the high-pressure bubble tower 75 to control the temperature thereof. The gases and vapors from high-pressure bubble tower 75 are removed overhead via line 88, are passed through cooler 89, and introduced to high-pressure separator 90. The gases from separator 90 are passed via line 95 to line 71 and thence to absorber 73 with the gaseous vapors recovered in the initial high-pressure separation zone 66. The liquid product recovered in high-pressure separator 90 is withdrawn as bottoms via line 91 and introduced by pump 92 with the rich absorber oil from absorber 73 and naphtha from line 67 to still 70 by line 69. Rich absorber oil is withdrawn by line 124 and passed by pump 125 into line 69.

Still 70 is provided with trapout and reboiler 96. The bottoms from still 70 comprising lean absorber oil is withdrawn by valved line 97 to stripper 98, or may be diverted via valved line 99 and recovered as heavy naphtha. The absorber oil is subjected to stripping in stripper 98 by means of steam introduced through valved line 100 and then recycled via pump 101, line 102 and cooler 93 to the absorber 73. The overhead from stripper 98 is passed through cooler 103 on line 104 and introduced into separator 105. Water is withdrawn as bottoms by valved line 106 and the separated naphtha is recovered by valved line 107 which may join valved line 99 if desired. The catalytically and thermally cracked gasoline removed overhead from still 70 by valved line 108 passes through cooler 109 and enters separator 110. The light naphtha is withdrawn as bottoms from separator 110 by valved line 111 and pump 112 and passed in heat exchange with the bottoms from rectifier 113 before entering the rectifier. Heat exchanger 114 is provided for this purpose. If desired, a portion of the light naphtha may be diverted from valved line 111 to still 70 by valved line 115 provided for that purpose.

The rectified light naphtha is withdrawn as bottoms from the rectifier 113 by means of valved line 123. Reboiler 116 is provided to supply additional heat necessary in the rectification step. The normally gaseous hydrocarbons withdrawn as the overhead from rectifier 113 by valved line 117 pass into cooler 118 and enter separator 119 wherein the gases are removed under high pressure and recycled with other gases recovered from the system to absorber 73. The liquid product removed by line 120 and pump 121 may be recovered as a polymerization feed or a portion of it may be returned to rectifier 113 by valved line 122 as reflux.

In one embodiment of our invention, reduced crude is charged to the system and heated by heat exchange up to about 450° F. The liquid reduced crude is then preheated and charged to the reactor 10 via upflow conduit 12 as described above. If desired, process steam may be injected via line 39 in proportions of between about 2% and about 20% of the charge. The temperature within the reactor may be between about 850° F. and about 1100° F., for example about 950° F., and may be under a pressure of between about 5 and about 25 pounds per square inch, for example about 12 pounds per square inch in the dense turbulent phase and about 9 pounds per square inch in the dilute phase. The spent catalyst is introduced to the regenerator 11 by downflow conduit 16. A temperature of between about 900° F. and 1050° F., for example 1000° F., is maintained at pressures of between about 10 and 30 pounds per square inch, for example, 16 pounds per square inch. In the base of downflow conduit 16 a pressure of about 21 pounds per square inch is maintained, thus assuring flow of the catalyst from the reactor zone into the regenerator zone. Likewise, the pressure at the base of upflow conduit 12 is about 9 pounds per square inch, which gives a differential of approximately 7 pounds per square inch between the pressure in the regenerator and the pressure within the transfer line-upflow conduit 12.

The pressure in low-pressure scrubber and fractionator 40 is maintained at about 5 pounds per square inch, the inlet temperature is about 750° F., the liquid outlet temperature is between 500 and 600° F. and the light naphtha and gases leave the fractionator 40 at a temperature of between about 200° F. and about 250° F.

From the above description it will be seen that we have provided a unique process combining catalytic cracking of liquid feed in a fluid catalyst system and thermal cracking of a recycle stock. Reduced crude is sent as a liquid to a hindered, upflow-type powdered catalytic cracking process, and in the embodiment illustrated a combination reactor-regenerator is used wherein the reactor is superimposed upon the regenerator. However, the process which we have described is not limited to the use of this type of reactor. The product from the catalytic cracking step is fractionated and the gas is passed to an absorption system for recovery of the condensables. The naphtha cut from the catalytic cracking step is also sent to the absorption system along with the gases. The gas oil from the fractionation of the product from the catalytic cracking of the reduced crude is thermally cracked. This thermally cracked product is fractionated, the light product being sent to the absorption system, a light gas oil is sent to the catalytic cracking step, a heavy gas oil is recycled to the thermal cracking step, and a high-boiling fraction is eliminated as fuel oil. The light naphtha, a heavy naphtha and a polymerization feed are separated and recovered in the absorption system.

While we have described our process and apparatus in terms of particular embodiments thereof, it should be understood that we do not desire to be limited except as by the following claims.

We claim:

1. The method of contacting solids of small particle size with at least two separate gaseous streams which method comprises suspending such solids in a first gaseous stream and passing said stream upwardly in a first contacting zone at a velocity for maintaining a dense turbulent suspended solids phase therein superimposed by a light phase of low solids content, passing dense phase solids downwardly directly from said dense phase as an aerated solids column in a restricted zone which is separated laterally from dense phase solids in said first contacting zone but which communicates at its upper end with said first contacting zone, discharging aerated solids from the base of said column into a second contacting zone, suspending solids thus discharged from said column in a second gaseous stream and passing said gaseous stream upwardly in said second contacting zone at a velocity for maintaining a dense turbulent suspended solids phase therein superimposed by a light phase of low solids content, withdrawing dense phase solids separately from said last-named dense phase, suspending the withdrawn solids in a quantity of said first gaseous stream, passing the suspension upwardly in heat exchange with said second contacting zone, introducing the suspension into said first contacting zone, withdrawing said first gaseous stream from the light phase above the dense phase in said first contacting zone, withdrawing said second gaseous stream from the light phase above the dense phase in the second contacting zone, and maintaining the height of said column and the density of solids therein sufficient to effect downward flow thereof and to provide a seal between said first and second contacting zones.

2. The method of claim 1 which includes the further steps of centrifugally separating solids from said first gaseous stream after it has left the dense phase in the first contacting zone and before it is removed from said zone, returning the centrifugally separated solids to a dense catalyst phase in the first zone, centrifugally separating solids from the second gaseous stream after it has left the dense phase in the second contacting zone but before it is removed from said zone and returning said last-named centrifugally separated solids to a dense solids phase in said second contacting zone.

3. A cyclic process for separately contacting solids of small particle size with at least three separate gaseous streams which method comprises suspending said solids in a first gaseous stream and passing said stream upwardly through a first contacting zone at a velocity for producing a dense turbulent solids phase in said zone which is superimposed by a dilute solids phase, removing solids while still in dense phase condition as a downwardly moving body directly from the dense phase in said first contacting zone through an intermediate contacting zone which is below said first contacting zone, introducing a second gaseous stream into said body and passing said stream upwardly in said intermediate zone countercurrent to the downwardly flowing dense phase solids therein, introducing solids from the base of said intermediate zone directly into an upflow conduit extending within said first zone and in heat exchange relationship with at least a part of said intermediate zone, suspending solids thus introducing from the base of said zone in a third gaseous stream and passing said stream upwardly through said conduit into an upper second contacting zone at a velocity sufficient to maintain a dense turbulent solids phase therein superimposed by a dilute solids phase, withdrawing solids directly from the dense turbulent solids phase in said second contacting zone as a downwardly moving aerated column for suspension in said first gaseous stream, withdrawing said first gaseous stream combined with said second gaseous stream from the upper part of said first zone, separately withdrawing said third gaseous stream from the upper part of said second contacting zone and maintaining a height of aerated solids within said downwardly moving aerated column of sufficient density to effect a downward flow thereof and to provide a seal between said first and second zones.

4. The process of claim 3 wherein said solids consist essentially of hydrocarbon conversion catalyst material, wherein the first gaseous stream consists essentially of hydrocarbon vapors, said second gaseous stream is a stripping gas, and said third gaseous stream is an oxygen-containing regeneration gas, wherein endothermic conversion at a high temperature is effected by said solids in said first zone thereby causing an accumulation of carbonaceous deposits on said solids, wherein stripping is effected in said intermediate zone, and wherein exothermic regeneration is effected in said second zone, a part of the heat liberated by said exothermic regeneration being imparted to the intermediate zone through the heat exchange relationship of the second and intermediate zones respectively.

5. In the process of converting hydrocarbon oils by contacting their vapors at conversion temperatures with a powdered, solid conversion catalyst wherein said catalyst is dispersed in the oil vapors in an enlarged reaction zone, is deactivated by deposition of carbonaceous deposits thereon, is separated from said hydrocarbon vapors, is regenerated by dispersing in an oxygen-containing regeneration gas within an enlarged regeneration zone, is separated from said regeneration gas and is recycled back to said reaction zone for further contacting with hydrocarbons, the improvement comprising transferring the catalyst in the process with a minimum expenditure of energy and a minimum resistance to flow by conducting said reaction and regeneration in vertically spaced zones, effecting the separation of catalyst from gases or vapors by gravity within the upper zone, accumulating a body of catalyst within said upper zone, transferring downwardly catalyst from said upper zone in a dense aerated stream into said lower zone, dispersing the catalyst within said lower zone, separating the catalyst and the gases or vapors within the lower zone, accumulating a body of catalyst within said lower zone in a dense aerated phase, flowing the accumulated catalyst downwardly in indirect heat exchange with dense phase in the lower zone, simultaneously stripping gases or vapors from said catalyst, and transferring the stripped catalyst to said upper zone as a dilute dispersion in a stream of the gases or vapors, said dilute dispersion being segregated from, but in indirect heat exchange with, the dense phase in the lower zone.

6. In an apparatus for contacting gases or vapors with suspended solid catalyst including a first zone superimposed upon a second zone, a vertically disposed elongated seal extending from an intermediate point within said first zone to a point within the said second zone, means for maintaining a column of catalyst within said seal, means for discharging catalyst from said seal into said second zone, gasiform fluid inlet means for said second zone, means for introducing catalyst and a gasiform fluid into said first zone, and means for discharging gasiform products from said first zone, the improvement comprising a common wall between said first and second zones, a vertically disposed elongated catalyst draw-off wholly within said second zone and communicating at its base with a vertically disposed internal upflow conduit extending from within said second zone through the base of said superimposed first zone for conveying catalyst from said second zone to said first zone, means for discharging catalyst from said catalyst draw-off into said upflow conduit, and means for introducing a gasiform fluid into said upflow conduit.

7. An apparatus for contacting gases or vapors with suspended solid particles which comprises a first contacting zone and a subjacent second contacting zone, a vertically disposed elongated seal extending from within said first zone to a point within said second zone, means for maintaining a column of solid particles within said seal to prevent vapor or gas communication between said first contacting zone and said second contacting zone, means for discharging solid particles from said seal into said second contacting zone, means for introducing contact gases or vapors into said second contacting zone, a vertically disposed upflow conduit extending from within said second contacting zone through the base of said superimposed first contacting zone for conveying solid particles from said second contacting zone to said first contacting zone, means for withdrawing gases or vapors from said second contacting zone, a vertically disposed elongated solid particle accumulation zone within said second contacting zone and communicating at its base with said upflow conduit, means for introducing gases or vapors into said upflow conduit and means for discharging the gases or vapors from said first contacting zone.

8. An apparatus for converting hydrocarbon oils by the aid of a suspended solid catalyst which comprises a reaction zone superimposed upon a regeneration zone, a vertically disposed elongated seal extending from an intermediate point within said reaction zone to a point near the base of said regeneration zone, means for maintaining a column of catalyst within said seal to prevent vapor communication between said regeneration zone and said reaction zone, means for discharging catalyst from said seal into said regeneration zone, means for introducing oxygen-containing gases into said regeneration zone, a vertically disposed upflow conduit extending from an intermediate point within said regeneration zone through the base of said superimposed reaction zone for conveying catalyst from said regeneration zone to said reaction zone, means for withdrawing gases from said regeneration zone, a vertically disposed elongated catalyst draw-off wholly within said regeneration zone and communicating at its base with said upflow conduit, means for introducing hydrocarbons into said upflow conduit and means for discharging reaction products from said reaction zone.

9. A catalytic hydrocarbon conversion system which comprises an upflow reactor superimposed above a regenerator, a common wall between said reactor and regenerator, a reactor standpipe extending from within said reactor through said common wall into a dense catalyst phase in said regenerator, means for introducing hydrocarbons into the lower part of the reactor and for intoducing regenerated catalyst into the reactor whereby said introduced catalyst may be suspended in the hydrocarbons for effecting conversion, said means comprising an upflow conduit extending through at least a part of said regenerator and communicating with the dense catalyst phase of the superimposed reactor, means for accumulating catalyst in the lower part of the reactor, means for aerating the catalyst in the bottom of the reactor and reactor standpipe, means for introducing catalyst from the reactor standpipe into a dense catalyst phase in the lower part of the regenerator, means for introducing air in the lower part of the regenerator so as to disperse catalyst from the reactor standpipe as a suspended dense catalyst phase in the regenerator, means for separating catalyst from regeneration gases, and means for returning regenerated catalyst to the lower part of the superimposed reactor.

10. In an apparatus for converting hydrocarbon oils by the aid of suspended solid catalyst including a reaction zone superimposed upon a regeneration zone, a vertically disposed elongated seal extending from an intermediate point within said reaction zone to a point within the said regeneration zone, means for maintaining a column of catalyst within said seal, means for discharging catalyst from said seal into said regeneration zone, means for introducing oxygen-containing gases into said regeneration zone, means for introducing regenerated catalyst and hydrocarbon feed into said superimposed reaction zone, and means for discharging reaction products from said reaction zone, the improvement comprising a vertically disposed elongated catalyst draw-off wholly within said regeneration zone and communicating at its base with a vertically disposed internal upflow conduit extending from an intermediate point within said regeneration zone through the base of said superimposed reaction zone for conveying catalyst from said regeneration zone to said reaction zone, means for discharging catalyst from said catalyst draw-off into said upflow conduit, and means for introducing hydrocarbons into said upflow conduit.

11. In the process of converting hydrocarbon oils by contacting their vapors at conversion temperatures with a powdered solid conversion catalyst wherein said catalyst is suspended in the oil vapors in an enlarged reaction zone, is deactivated by deposition of the carbonaceous deposits thereon, is separated from said hydrocarbon vapors, is regenerated by dispersing in an oxygen-containing regeneration gas within an enlarged regeneration zone, is separated from said regeneration gas and returned to said reaction zone for further contacting with hydrocarbons, and wherein the reaction zone is superimposed above the regeneration zone, the improvement comprising flowing catalyst from said reaction zone to said regeneration zone in a dense aerated stream, thereby effecting a seal between the said zones, accumulating a portion of the regenerated catalyst in a dense aerated body within the regeneration zone, stripping the regeneration gas from said regenerated catalyst, commingling said accumulated regenerated catalyst and the hydrocarbon feed and flowing the stream of hydrocarbons and catalyst upwardly through a conduit within the regeneration zone into the superimposed reaction zone.

12. The process converting hydrocarbon oils which comprises maintaining a body of dispersed catalyst in a reaction zone, introducing hydrocarbon vapors into the reaction zone near the base thereof at such a rate that the vertical vapor velocity in said zone will maintain a dense turbulent suspended catalyst phase within the reactor, withdrawing spent catalyst from said reaction zone at a point within the dense turbulent suspended catalyst phase, accumulating directly a body of spent catalyst in an aerated dense phase, introducing a fluid into said accumulated catalyst for stripping hydrocarbon vapors therefrom and for maintaining the catalyst in fluid condition, introducing the said catalyst into a dense turbulent catalyst phase within a regeneration zone, dispersing said catalyst in an oxygen-containing gas within said regeneration zone and introducing said gas at such a rate as to maintain a dense turbulent catalyst phase within said zone, accumulating a body of hot regenerated catalyst in an aerated dense phase, withdrawing regenerated catalyst from said body of catalyst and conveying the regenerated catalyst upwardly to said reaction zone as a dispersed catalyst phase in indirect heat exchange with regeneration gases within the regeneration zone.

13. The method of contacting fluidized solids with two separate gasiform streams which method comprising passing a first gasiform stream upwardly through a lower contacting zone but out of contact with solids in said lower zone, and into the base of an upper contacting zone, suspending solids from the lower contacting zone in said upwardly passing stream, distributing said upwardly passing stream and suspended solids in said upper contacting zone, employing a vertical upward velocity of the gasiform stream in the upper contacting zone to maintain a mass of solids in dense phase turbulent suspension superimposed by a light dispersed solids phase, withdrawing said first gasiform stream substantially free from solids from said dispersed solids phase in the upper contacting zone, separately withdrawing solids as a downwardly moving column from the dense solids phase in the upper contacting zone, suspending solids from the base of said column in a second gasiform stream, passing the second gasiform stream upwardly through said lower contacting zone at a velocity to maintain a dense turbulent suspended solids phase therein superimposed by a light dispersed solids phase, removing the second gasiform stream substantially free from solids from the light, dispersed solids phase in the lower contacting zone, and separately removing solids from the dense phase in the lower contacting zone for suspension in said upwardly passing first gasiform stream.

14. The method of claim 13 wherein the first gasiform stream consists essentially of hyrocarbons and the second gasiform stream consists essentially of air.

15. The method of claim 13 wherein the first gasiform stream consists essentially of air and the second gasiform stream consists essentially of hydrocarbons.

16. The method of claim 13 which includes the steps of contacting the solids with a third gasiform stream after its removal from one of said contacting zones and prior to its introduction into the other of said contacting zones.

17. An apparatus in which to effect contact between fluids and subdivided solids which comprises, in combination, two confined contacting zones arranged in superimposed relation, each zone being adapted to retain therein a bed of subdivided solid contact material, means for supplying a separate stream of fluid to each of said zones and for passing the same upwardly in contact with the respective beds at controlled velocity, means for discharging a resulting stream of fluid from the upper portion of each of said beds and from the respective zones, means for transferring solid particles between said beds from the lower to the upper zone comprising a pair of contiguous vertical conduits disposed within said lower zone, the first of said contiguous conduits leading downwardly from a point of the bed in the lower zone beneath its upper extremity into the lower end of the second of said contiguous conduits and said second conduit communicating at its upper end with said bed in the upper zone, means for passing said stream of fluid being supplied to the upper zone through the second conduit, means for transferring solid particles between said beds from the uuper to the lower zone comprising a third conduit leading downwardly from a point of the bed in the upper zone beneath its upper extremity and communicating at its lower end with the bed in the lower zone, and means for regulating the rate at which solid particles are passed through said conduits.

18. The apparatus of claim 17 in which said pair of contiguous vertical conduits are concentric with respect to each other.

19. The apparatus of claim 17 wherein the third conduit is a substantially straight vertical open-ended conduit.

20. An apparatus of the class described comprising, in combination, a vertically elongated substantially cylindrical vessel having an upper and a lower head and an intermediate partition dividing the vessel into upper and lower compartments, an inlet conduit for supplying fluid to the lower portion of the lower compartment, a first transfer conduit, open at its upper end and provided with pressure reducing means adjacent its lower end, extending vertically within the lower compartment from an intermediate point in the lower compartment to adjacent the lower head of the vessel, a second substantially straight transfer conduit contiguous with said first conduit, said second conduit being open at its opposite ends and extending vertically from a point communicating with the base of said first conduit adjacent the last-named pressure reducing means into communication through the partition with said upper compartment, a third substantially straight transfer conduit open at its upper end and having pressure reducing means disposed adjacent its lower end, said transfer conduit extending vertically downward within the vessel from said upper to said lower compartment, means for supplying fluid to the lower end of said second conduit and therethrough into said upper compartment, and means for removing a separate stream of fluid from each of said compartments.

21. A hydrocarbon conversion process which comprises maintaining a suspended turbulent dense catalyst phase superimposed by a light dispersed catalyst phase in a regeneration zone by passing a regeneration gas stream upwardly at low velocity therethrough, maintaining a suspended turbulent dense catalyst phase superimposed by a light catalyst phase in a conversion zone at a lower level and directly underneath the regeneration zone by passing a charging stock vapor stream at low velocity upwardly through said conversion zone, withdrawing catalyst from the dense phase in the conversion zone into a stripping zone a substantial portion of which is at the same elevation as the conversion zone, stripping the catalyst with a gaseous stripping agent in said stripping zone, suspending catalyst from the base of said stripping zone at a regulated rate into a regeneration gas stream and conveying it in heat exchange relationship with the stripping zone by said regeneration gas stream to said regeneration zone, distributing said regeneration gas stream and the catalyst conveyed by it into said regeneration zone, withdrawing catalyst as a downwardly moving aerated column from the dense phase in the regeneration zone and returning said catalyst from the base of said column to the dense catalyst phase in the conversion zone.

22. A method of contacting finely divided solid particles successively with two fluids which comprises maintaining two solid particle fluid contacting zones in vertical alignment and partitioned from each other, the lower portion of each zone being normally filled with a dense solids phase and the upper portion of each zone normally containing only a small amount of solid particles in dilute phase, continuously passing solid particles vertically downward in a column from a point within the lower portion of the lower contacting zone, reversing the direction of flow of said solid particles by admixing them with a vertically upward flowing stream of fluid to be contacted in the upper contacting zone, passing the resultant mixture upwardly in straight line flow in a confined path extending in heat exchange relationship with said column and at least the upper part of said lower zone, thereafter discharging said mixture into the lower portion of said upper contacting zone wherein the upward velocity of said fluid will cause the dense solids phase therein to be maintained in turbulent condition, continuously passing solid particles from the dense phase in the upper contacting zone through a downwardly moving second column into said lower contacting zone, withdrawing fluid from the dilute phase in the upper contacting zone and passing a second fluid through the lower contacting zone in contact with the solid particles therein.

23. A process for the catalytic conversion of hydrocarbons which comprises maintaining two vertically aligned separate contacting zones, maintaining one of said contacting zones at conversion conditions and maintaining the other of said contacting zones at regeneration conditions, maintaining a suspended dense turbulent phase of finely divided catalyst particles in the lower of said vertically aligned contacting zones, continuously withdrawing catalyst particles vertically downward in a column from the dense phase in said lower contacting zone, reversing the direction of flow of said withdrawn catalyst particles by admixing them with a vertically upward flowing gasiform stream, passing the resulting suspension upwardly in straight line flow in a confined path extending in heat exchange relationship with said column and at least a part of said lower zone, thereafter discharging said suspension into the upper of said vertically aligned contacting zones wherein the upward velocity of the gasiform stream will cause the maintenance of a lower dense turbulent catalyst phase and an upper relatively dilute catalyst phase, continuously passing catalyst particles from the dense turbulent phase in the upper zone to the dense catalyst phase in the lower contacting zone, withdrawing gasiform materials from said dilute phase, passing a second gasiform stream into and through the lower contacting zone in contact with the dense phase moving mass of catalyst particles therein and withdrawing gasiform materials from said lower contacting zone.

24. A method for contacting a subdivided solid successively with two fluids which comprises maintaining a bed of subdivided solid particles in each of two contacting zones disposed in vertical alignment, passing one of said fluids through the bed in the lower of said zones, continuously discharging solid particles from the upper of said zones to the bed in the lower of said zones, withdrawing solid particles vertically downward in a column from a point in the lower bed, reversing the direction of flow of the particles withdrawn in said annular column by commingling solid particles from the base of said column with a vertically upward flowing stream of the other of said fluids, passing the resultant mixture upwardly in straight line flow in a confined path extending in heat exchange relationship with said column and at least a portion of the bed in said lower zone and then discharging the mixture into the lower portion of the upper zone at sufficient velocity to maintain the bed in the last-mentioned zone in turbulent condition.

25. A process for the catalytic conversion of hydrocarbons which comprises maintaining a bed of subdivided solid catalyst particles in a lower contacting zone and in an upper contacting zone disposed in vertical alignment, one of said zones being a conversion zone and the other being a regeneration zone, passing a first gasiform stream at high temperature through the catalyst bed in the lower contacting zone, continuously discharging catalyst particles from the upper contacting zone to the catalyst bed in the lower contacting zone, withdrawing catalyst particles vertically downward in a column from a point in the lower contacting zone, reversing the direction of flow of the downwardly withdrawn particles by commingling the same with a vertically upward flowing second gasiform stream, passing the resultant mixture upwardly in straight line flow in a confined path extending in heat exchange relationship with said column and through at least a part of the bed in the lower contacting zone and then discharging said mixture into the lower portion of the upper contacting zone at sufficient velocity to maintain the bed in the last-mentioned zone in turbulent condition, one of said gasiform streams being a hydrocarbon stream at conversion temperature and the other of said streams being an oxygen-containing regeneration gas at combustion temperature for burning carbonaceous matter deposited on said catalyst in the conversion zone.

26. An apparatus of the class described comprising a vertically elongated shell, partitioning means dividing the shell into an upper contacting chamber and a lower contacting chamber, means for maintaining a dense phase moving mass of solid particles in each of said zones, fluid inlet and outlet means for said lower zone, a discharge conduit for solid particles extending vertically downward from a point in the moving dense phase mass in the lower contacting zone, an open-ended vertical conduit extending from the lower portion of said discharge conduit through at least a portion of the lower contacting chamber and to said partitioning means for communication with the upper contacting chamber, a fluid inlet at the lower end of said discharge conduit and in communication with said open-ended conduit, a second open-ended vertical conduit disposed in said shell out of alignment with the first-named open-ended conduit and extending from a point within the upper contacting chamber through said partitioning means into the lower contacting chamber and means for removing fluid from said upper contacting chamber.

ROBERT C. GUNNESS.
JOHN F. SNUGGS.

REFERENCES CITED

The following references are of record in the file of this patent:

UNITED STATES PATENTS

| Number | Name | Date |
| --- | --- | --- |
| 2,304,128 | Thomas | Dec. 8, 1942 |
| 2,341,193 | Scheineman | Feb. 8, 1944 |
| 2,347,682 | Gunness | May 2, 1944 |
| 2,363,874 | Krebs | Nov. 28, 1944 |
| 2,367,351 | Hemminger | Jan. 16, 1945 |
| 2,347,747 | Melaven | May 2, 1944 |
| 2,412,152 | Huff | Dec. 3, 1946 |